United States Patent [19]

Matsumura et al.

[11] Patent Number: 4,902,592
[45] Date of Patent: Feb. 20, 1990

[54] PRODUCTION OF COLOR DISPLAY

[75] Inventors: Akira Matsumura, Hirakata; Masashi Ohata, Osaka; Katsukiyo Ishikawa, Kuze, all of Japan

[73] Assignee: Nippon Paint Co., Ltd., Osaka, Japan

[21] Appl. No.: 221,043

[22] Filed: Jul. 18, 1988

[30] Foreign Application Priority Data

Jul. 17, 1987 [JP] Japan .................. 62-179655

[51] Int. Cl.⁴ ............. B44C 1/04; G02F 1/13
[52] U.S. Cl. ........................... 430/7; 430/20; 430/257; 430/258; 430/320; 430/394; 350/339 F; 204/18.1; 204/20
[58] Field of Search ............ 430/4, 7, 20, 257, 258, 430/322, 321, 320, 325, 326, 329, 394; 350/339 F; 204/18.1, 20, 22, 181.1, 181.5

[56] References Cited

U.S. PATENT DOCUMENTS

| | | | |
|---|---|---|---|
| 3,904,411 | 9/1975 | Erickson et al. | 430/257 |
| 4,617,094 | 10/1986 | Kamamori et al. | 430/321 |
| 4,639,088 | 1/1987 | Suginoya et al. | 350/339 F |
| 4,704,559 | 11/1987 | Suginoya et al. | 350/339 F |
| 4,766,053 | 8/1988 | Shinozaki et al. | 430/258 |

FOREIGN PATENT DOCUMENTS 226218 6/1987 European Pat. Off. .
2337819 1/1976 Fed. Rep. of Germany .

OTHER PUBLICATIONS

Patent Abstracts of Japan, vol. 9, No. 97 (P-352) (1820), 1985.
Patent Abstracts of Japan, vol. 10, No. 165 (P-467) (2221), 1986.

Primary Examiner—José G. Dees
Assistant Examiner—Donald J. Loney
Attorney, Agent, or Firm—Wenderoth, Lind & Ponack

[57] ABSTRACT

A process for preparing a color display comprising the following steps:
(a) preparing an uncolored base plate comprising a base plate, an electroconductive layer formed on said base plate and a photosensitive resin layer formed thereon, said photosensitive resin layer being patterned by exposing to light through a mask and developing it to let a portion of the electroconductive layer to be colored appear,
(b) forming a color layer by electrodeposition on the portion of the electroconductive layer to be colored,
(c) transferring the color layer onto a transfer plate, and
(d) further transferring and fixing the color layer onto a transparent substrate from the transfer plate, wherein if the color display is colored with more than one color, the processes (a) to (d) are repeated for the other colors, but once said uncolored base plate is formed, the processes (b) to (d) are repeated.

7 Claims, 1 Drawing Sheet

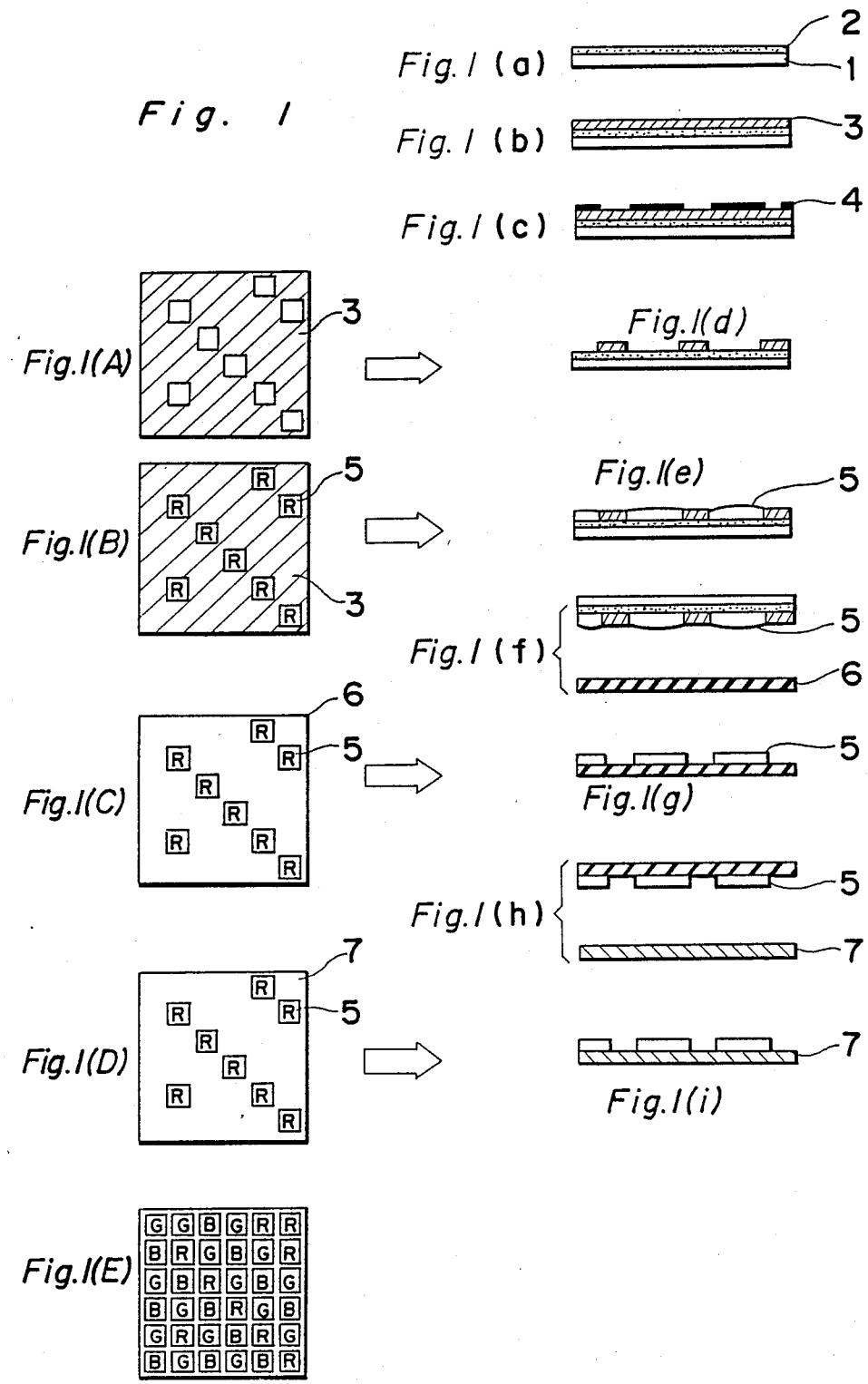

PRODUCTION OF COLOR DISPLAY

FIELD OF THE INVENTION

The present invention relates to a process for preparing a color display having a color layer formed by electrodeposition and transfer printing.

BACKGROUND OF THE INVENTION

A color display is employed as a display for a liquid crystal color television and the like. It generally is composed of a transparent substrate and a color layer thereon. Recently, in producing the color display, electrodeposition has become noteworthy.

Japanese Kokai Publication (unexamined) No. 114572/1984 discloses a process for producing a color display wherein a transparent electrode is patterned on a glass substrate and then immersed in an electrodeposition bath while a voltage is applied to a portion of the transparent electrode to be colored with, for example, red to form a red color layer, then green and blue color layers were formed on each portion of the electrode by passing electric current. In the apparatus produced by the process, the transparent electrode is employed not only for electrodepositing a color layer, but also for driving a liquid crystal when assembled to a liquid crystal display apparatus. However, since the color layer electrodeposited on the electrode in turn becomes an insulating layer in the apparatus, a high voltage is needed for driving the liquid crystal. In order to reduce the driving voltage, an additional transparent electrode layer which is for driving the liquid crystal is formed on the color layer. The formation of the additional electrode is time and cost consuming because it makes the process complicated and requires a further patterning process. Also, since a transparent electrode generally has a light transmittance of 80 to 85%, two transparent electrodes reduces the light transmittance of the display, thus deteriorating properties of the color display.

The present inventors proposed as a solution of the above problems that a color layer is formed on a transfer panel and then transferred onto a transparent substrate (Japanese Patent Application Ser. No. 102339/1987). In this process, since the color layer is electrodeposited on a patterned electroconductive layer as covering and wrapping the electroconductive layer, irregularities due to the electroconductive layer remain in the transferred color layer to cause color shading.

SUMMARY OF THE INVENTION

It has been found that the above defects are obviated by a new process wherein patterning an electroconductive layer is not carried out. Thus, the object of the present invention is to provide a process for preparing a color display comprising the following steps:

(a) preparing an uncolored base plate comprising a base plate, an electroconductive layer formed on said base plate and a photosensitive resin layer formed thereon, said photosensitive resin layer being patterned by exposing to light through a mask and developing it to let a portion of the electroconductive layer to be colored appear, (b) forming a color layer by electrodeposition on the portion of the electroconductive layer to be colored, (c) transferring the color layer onto a transfer plate, and (d) further transferring and fixing the color layer onto a transparent substrate from the transfer plate, wherein if the color display is colored with more than one color, the processes (a) to (d) are repeated for the other colors, but, once said uncolored base plate is formed for use in connection with a particular color, only the processes (b) to (d) need be repeated for preparing duplicate color displays using that color.

BRIEF EXPLANATION OF THE DRAWINGS

FIG. 1 is a process drawing showing the process of the present invention.

FIG. 1 (a) to (i) are process drawings showing section views and FIG. 1 (A) to (E) are plane views of FIG. 1 (d), (e), (g), (i) and a final product.

DETAILED DESCRIPTION OF THE INVENTION

The process of the present invention can be divided into the preparation of an uncolored base plate, which is shown in FIG. 1 (a) to (d), and the preparation of the color display by the transferring process using the uncolored base plate, which is shown in FIG. 1 (e) to (i).

First of all, as is shown in FIG. 1 (a), an electroconductive layer 2 was formed on the base plate 1. The base plate is made from glass, plastic and the like. The electroconductive layer 2 can be formed from an electroconductive metal, such as copper, silver and the like, or a transparent electroconductive material, such as indium tin oxide, gold, platinum, nickel and the like. The layer 2 can be formed by spray coating, sputtering and the like.

Next, as is shown in FIG. 1 (b), a negative or positive type photosensitive resin composition layer 3 is formed on the electroconductive layer 2 by spray coating, dipping and the like. The negative type photosensitive resin composition is one which is eluted with a developer at a non-exposed portion, for example a resin composition comprising a resin having a carbon-carbon double bond and a photopolymerization initiator. The positive type photosensitive resin composition is one which is eluted with a developer at an exposed portion, for example a resin composition comprising a resin having a quinone diazide group. When the positive type photosensitive resin composition having a quinone diazide group is formed to be basic, polymerizable monomers having a hydroxy group are copolymerized with $\alpha,\beta$-ethylenic unsaturated monomers having a basic group and often a hydroxy group of this copolymer is esterified with a quinonediazide sulfonic acid. The esterified copolymer is neutralized with an acid in the basic group of the $\alpha,\beta$-ethylenic unsaturated compound and dispersed into water. The photosensitive resin composition is discussed in detail in Japanese Kokai Publication 206293/1986 and 165053/1985.

A negative or positive mask 4 was placed on the negative or positive type photosensitive resin composition layer 3 (FIG. 1 (c)) to expose to light. The exposed base plate 1 is developed with a developer to form an uncolored base plate (FIG. 1 (d)). The technique of masking and developing is known to the art. After developing, a portion of the electroconductive layer 2 to be colored appears as shown in FIG. 1 (A).

This uncolored base plate can be repeatedly used once made so as to simplify the preparing process, if the display is colored with only one color, one uncolored base plate will be enough. However, if the display is colored with more than one color, the necessary number of uncolored base plates has to be prepared. For making it simple, an explanation is given for where the display is colored with three colors, i.e. red, green and blue.

As shown in FIG. 1 (e), electrodeposition is carried out in a red electrodeposition bath while applying voltage to the electroconductive layer 2 to form a red color layer 5, of which a plane view is shown in FIG. 1 (B). The electrodeposition bath contains a red pigment and a film forming resin which is cationic, anionic or amphoteric. Examples of the film forming resins are acrylic resin, epoxy resin, urethane resin, polybutadiene resin, polyamide resin, carboxyl group-containing polybutadiene, carboxyl group-containing alkyd resin and the like. Since the electroconductive layer 2 may be corroded by the ionic type of the film forming resin, it is noted that attention has to be paid to the selection of the ionic type of the resin. For example, if the electroconductive layer is metal, an anionic resin may lead it to be corroded and therefore is not suitable. In adverse, if the electroconductive layer is a transparent one, a cationic resin would be unsuitable. The electrodeposition bath and the other details are described in Japanese Kokai Publication No. 114592/1984 and Japanese Patent Application Ser. No. 46321/1986 to the present inventors. The electrocoating composition can be either photocurable or heatcurable.

Next, as is shown in FIG. 1 (f), a transfer plate 6 is pressed on the color layer of the base plate 1 and the color layer is transferred onto the transfer plate 6, as shown in FIG. 1 (g) or FIG. 1 (c). The remaining base plate 1 which has the electrocoductive layer and the patterned photosensitive resin layer thereon, as shown in FIG. 1 (d), is again used as an uncolored base plate. The transfer plate 6 can be made of the same material as the base plate. Preferred is a flexible one in order to make it easy to transfer. Examples of the transfer plates are a polyethylene terephthalate film, a cellulose triacetate film, a polystyrene film, a polycarbonate film or a polymer-laminated paper or glass.

Transferring may be carried out in such a manner that the surface of the color layer 5 is contacted with the surface of the transfer plate 6 and pressed by a rubber covered roller.

The next process, as shown in FIG. 1 (h), is transferring the color layer 5 onto a transparent substrate 7 from the transfer plate 6 (FIG. 1 (i) and (D)). Transferring can be carried out by a rubber covered roller, similar to the above. If the color layer is photocurable, the transfer plate 6 may be removed after exposing the contacted plates to light. Exposing is generally carried out at 200 mJ/cm$^2$ and room temperature in the air, but, if the color layer is more durable, radiation can be more. If the color layer is heatcurable, after removing the transfer plate 6, the substrate 7 is subjected to heat treatment.

The above processes of FIG. 1 (a) to (i) are repeated with the other colors to be colored with green and blue to form a color display of the present invention (FIG. 1 (E)).

On the color display, a transparent electrode generally is formed by vapor-depositing, sputtering and the like to form a color display apparatus.

The above explanation is for the preparation of more than one color., but the process of the present invention is applicable to a monocolor display. Also, in case of the monocolor display, the transfer plate 6 is not always necessary, so that the color layer 5 may be transferred directly onto the transparent substrate 7 from the base plate 1. The reason why the transfer plate 6 is employed is that a second color layer can not be contacted with the surface of the transparent substrate 7 due to the existence of a first transferred color layer.

EXAMPLES

The present invention is illustrated by the following examples, which are not to be construed as limiting the scope of the invention to their details.

REFERENCE EXAMPLE 1

Preparation of Cationic Positive Type Photosensitive Resin Composition

A 500 ml separable flask was charged with 80 parts by weight of ethylene glycol monomethyl ether and heated to 80° C. A solution containing 342 parts by weight of butyl acrylate, 39.8 parts by weight of methyl methacrylate, 71.5 parts by weight of 3-(o-hydroxybenzoyloxy)-2-hydroxypropyl methacrylate and 12.0 parts by weight of 3-(2-hydroxypropylamino)-2-hydroxypropyl methacrylate, and another solution containing 2.0 parts by weight of (2,2'-azobis-(4-methoxy-2,4-dimethylvalelonitrile)) in 80 parts by weight of dioxane were added to it over 3 hours and mixed for 2 hours to obtain a copolymer solution.

Next, 3.3 parts by weight of acetic acid was added to the copolymer solution, and then 50 parts by weight of 1,2-naphthoquinone-2-diazide-5-sulfonic acid ester of 2,4-dihydroxybenzophenone was dissolved in it. 3,500 parts by weight of water was slowly added under mixing to obtain an electrodeposition bath.

REFERENCE EXAMPLE 2

Preparation of Cationic Photosensitive Electrodepositable Resin Composition for Color Layer An organic polymer binder having a weight average molecular weight of about 70,000 was obtained by reacting N,N-diethylaminoethyl methacrylate, styrene, ethylacrylate and a 1/1 molar ratio reaction product of p-hydroxybenzoic acid and glycidyl acrylate in a molar ratio of 3:2:4:1. A cationic photocurable resin composition was prepared by mixing 80 parts by weight of the organic polymer binder obtained above, 0.5 parts by weight of 2,2-dimethoxy-2-phenyl acetophenone and 14.5 parts by weight of trimethylolpropane triacrylate, which was diluted with ethylene glycol monobutyl ether to a volatile content of 80%. The obtained solution was neutralized with 0.5 equivalent of acetic acid and adjusted with deionized water to a volatile content of 10% to form an electrodepositable resin composition.

The obtained resin composition was mixed with a pigment in the following formulation to obtain three color cationic electrodeposition baths.

|  | Blue | Green | Red |
| --- | --- | --- | --- |
| Cationic photocurable electrodeposition coating composition | 995.0 | 995.0 | 995.0 |
| Phthalocyanine Blue | 5.0 | — | — |
| Phthalocyanine Green | — | 5.0 | — |
| Azo metal salt red pigment | — | — | 5.0 |
|  | 1000.0 | 1000.0 | 1000.0 |

EXAMPLE 1

An anode was connected with a glass-epoxy base panel having a copper film thereon and a cathode was connected with a metal container of the electrodeposition bath. A direct voltage of 20 volt was applied to the electrodes for 30 seconds to electrodeposit about 2.0 microns of the cationic positive type photosensitive resin composition on the copper film, which was dried to form a positive type photosensitive resin composition layer 3.

Next, a positive mask 4 having a pattern was placed on the resin layer 3 and exposed to a high pressure mercury lamp. The exposed base plate was developed with an alkali solution, to dissolve and remove the exposed portion and thus cause the copper layer 2 to appear.

The base plate 1 was immersed in a red electrodeposition bath prepared in Reference Example 2 and electrodeposition was carried out at 30 volt direct voltage for one minute. The base plate 1 was thereafter taken out of the bath and rinsed with water followed by drying to form a transparent red color layer 5 as shown in FIG. 1 (B).

Then, a transfer plate 6 of polyethylene terephthalate film was contacted with the color layer 5 which was transferred onto the transfer plate 6 and then the base plate 1 was removed.

Next, the color layer 5 on the transfer plate was then contacted with a transparent glass substrate 7 and transferred onto it. The substrate 7 was exposed to a mercury lamp at 200 mJ/cm² to cure the color layer 5. The color layer thus cured had a thickness of 3.0 microns.

The processes of FIG. 1 (a) to (i) were repeated in the order of blue and green.

The color display prepared by the present invention is very accurate even if the pattern is fine, thus obtaining an excellent color display apparatus. According to a conventional method, it is required that an electroconductive layer is patterned for electrodeposition, but once breaking of the pattern occurs the successive processes become impossible. According to the present invention, no patterning process of the wire is required so that such defects due to the breaking do not happen. By the present invention, no electrode for electrodeposition is intervened between a transparent substrate and a color layer so as not to cause the reduction of the driving voltage and low light permeability. According to the present invention, a color layer is formed between photosensitive resin layers to cause its surface to be smooth and uniform. Also, no color shading occurs.

What is claimed is:

1. A process for preparing a color display comprising the following steps:
   (a) preparing an uncolored base plate comprising a base plate, an electroconductive layer formed on said base plate and a photosensitive resin layer formed on said electroconductive layer, said photosensitive resin layer being patterned by exposing it to light through a mask and developing it to let a portion of the electroconductive layer to be colored appear,
   (b) forming a color layer by electrodeposition on the portion of the electroconductive layer to be colored,
   (c) transferring the color layer onto a transfer plate, and
   (d) further transferring and fixing the color layer onto a transparent substrate from the transfer plate,
   wherein when the color display is colored with only one color, the step (c) is omitted to directly transfer the color layer onto the transparent substrate.

2. The process according to claim 1 wherein the base plate is made from glass or plastic.

3. The process according to claim 1 wherein the electroconductive layer is formed from copper, silver, indium tin oxide, gold, platinum or nickel.

4. The process according to claim 1 wherein the photosensitive resin layer is negative or positive type.

5. The process according to claim 1 wherein the transferring step (c) is carried out by contacted the surface of the color layer with the surface of the transfer plate and pressing by a rubber plate or a rubber covered roller.

6. The process according to claim 1 wherein the transfer plate is a polyethylene terephthalate film, a cellulose triacetate film, a polystyrene film, a polycarbonate film or a polymer-laminated paper or glass.

7. The process according to claim 1, wherein steps (a) to (d) are repeated using a different color for the color layer than in the first series of steps (a) to (d), to prepare a color display colored with more than one color.

* * * * *